Aug. 18, 1931.   D. SENSAUD DE LAVAUD   1,819,947
HYDRAULIC STRESS TRANSMITTING SYSTEM
Filed Jan. 3, 1930   2 Sheets-Sheet 1
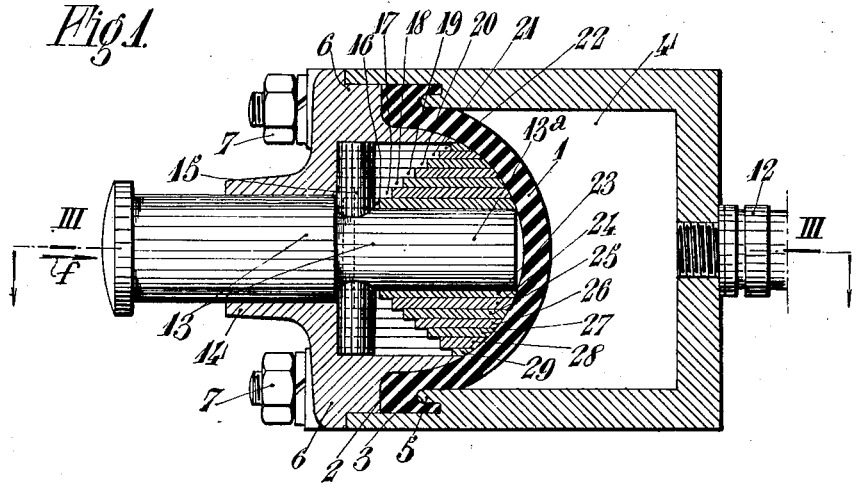
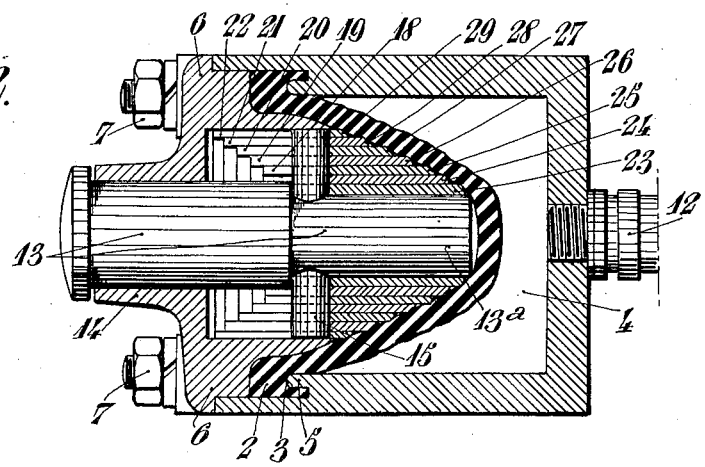
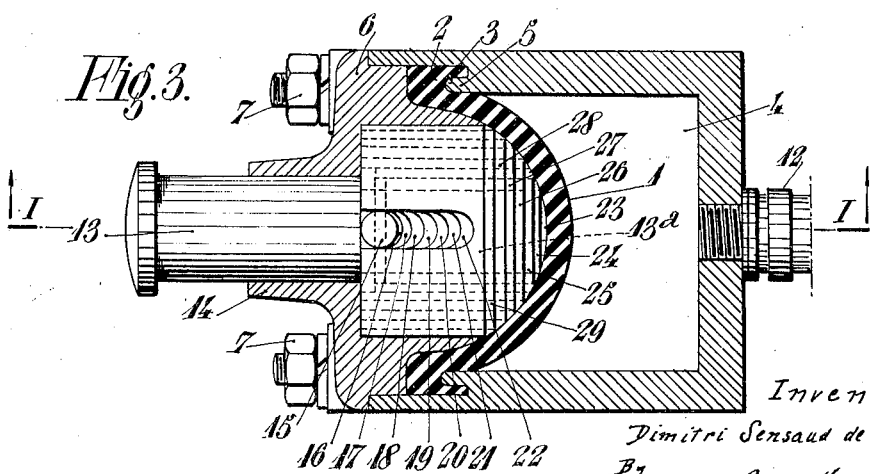
Inventor:
Dimitri Sensaud de Lavaud
By Langner, Parry, Card & Langner
Attys Aug. 18, 1931.  D. SENSAUD DE LAVAUD  1,819,947
HYDRAULIC STRESS TRANSMITTING SYSTEM
Filed Jan. 3, 1930   2 Sheets-Sheet 2
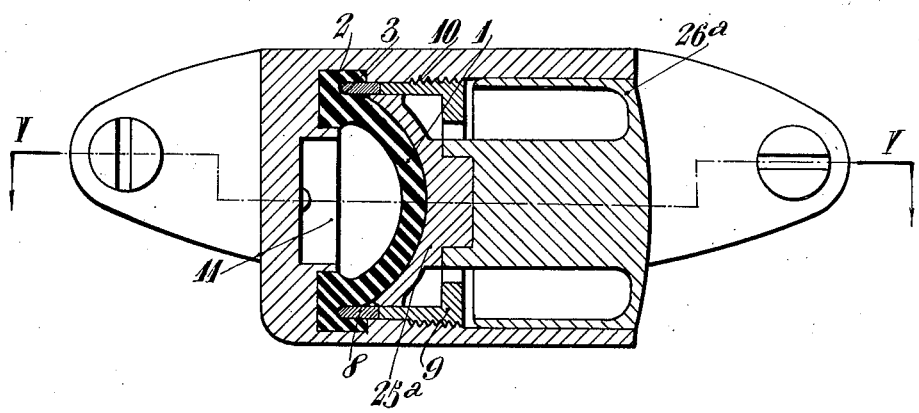
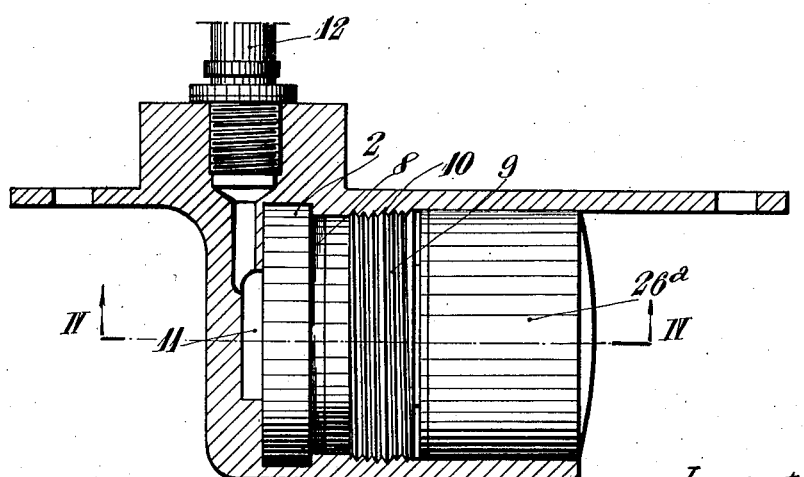
Inventor:
Dimitri Sensaud de Lavaud, Patented Aug. 18, 1931

1,819,947

UNITED STATES PATENT OFFICE

DIMITRI SENSAUD DE LAVAUD, OF PARIS, FRANCE

HYDRAULIC STRESS TRANSMITTING SYSTEM

Application filed January 3, 1930, Serial No. 418,409, and in France December 27, 1928.

This invention has for an object improvements in hydraulic stress transmitting devices which comprise a transmitting system and a receiving system, each having a distortable rubber wall hermetically closing the space containing the liquid.

In these devices, a difficulty has been met with in the construction of the transmitting system, in which the rubber wall is distorted by the action of a piston on which the stress to be transmitted is exerted. This difficulty consists in that the rubber wall rapidly deteriorates, because the rubber elongates or stretches only between the securing surface of the rubber wall and the surface of the piston bearing on this wall. The rubber does not therefore work uniformly throughout.

The invention has for a main object to remedy this inconvenience, and to prevent the deterioration of the rubber wall of the transmitting system.

Another object of the invention consists in improving the method of securing the rubber wall to the transmitting system as well as to the receiving system.

The accompanying drawings illustrate, by way of example, a form of construction of the invention.

Figure 1 is a sectional elevation of the transmitting system at rest, according to a section along line I—I of Fig. 3.

Figure 2 is a view similar to Fig. 1, during the operation.

Figure 3 is a plan view thereof, partially in section, according to line III—III of Fig. 1.

Figure 4 is a sectional elevation of the receiving system, according to a section along line IV—IV of Fig. 5.

Figure 5 is a plan view, partially in section according to line V—V of Fig. 4.

In the transmitting apparatus (Figs. 1, 2 and 3) as in the receiving apparatus (Figs. 4 and 5), the rubber wall 1 is of hemispherical or approximately hemispherical shape, but the convexity of this wall is, in the transmitting apparatus, turned towards the capacity of chamber containing the stress transmitting liquid, whilst, on the contrary, in the receiving apparatus, it is the concavity of the rubber wall which is turned towards the capacity of chamber containing the fluid.

In both cases (transmitting apparatus and receiving apparatus) the rubber wall has a flange 2 which is provided with a groove 3 on the side of the convexity of the wall.

In the transmitting apparatus illustrated in Figs. 1, 2 and 3, the rubber wall is secured as follows: the chamber or cylinder 4 containing the transmitting liquid is provided with a flange 5 fitting into the groove 3. A cap 6 is clamped onto the cylinder 4 by means of bolts 7, so that the flange 2 of the rubber wall 1 is clamped between the cap 6 and the flange 5. This securing device is of great strength and completely fluid-tight.

In the receiving apparatus (Figs. 4 and 5) the rubber wall 1 is secured by means of a ring 8 which fits into the groove 3 and is clamped by a screw-threaded socket 9 which screws in the threaded portion 10 of the cylinder 11. This securing device of the rubber wall is equivalent to the preceding one.

The cylinder 4 of the transmitting apparatus is connected by a pipe 12 to the cylinder 11 of the receiving apparatus. The chamber formed by the said cylinders 4 and 11 and by the pipe 12 is completely filled with liquid.

In the transmitting apparatus, a piston 13 receives the transmitting stress. This piston is guided in a bore or boss 14 of the cap 6. The piston 13 receives a transverse pin 15 which fits into diametral notches 16, 17, 18, 19, 20, 21, 22 of sleeves 23, 24, 25, 26, 27, 28, 29, fitting into each other about the end of the piston 13.

The sleeve 23, which directly fits over the piston 13, has a length slightly smaller than the portion 13$^a$ of smaller diameter of the piston; the sleeve 24, which fits on the sleeve 23, has a length slightly smaller than the latter, and so on, so that the sleeves and the piston fill up the space included between the cap 6 and the rubber wall 1. Moreover, the length of the notch 16 of the sleeve 23 is slightly smaller than the length of the notch 17 of the sleeve 24, and so on.

In the operation, when the piston 13 is pushed in the direction of the arrow $f$, it acts on the rubber wall by its end; then, the pin 15 comes to the end of the notch 16 of the sleeve 23, which then accompanies the piston 13 for the distortion of the rubber wall; then the pin 15 comes to the end of the notch 17 of the sleeve 24, and drives this sleeve, and so on. It will thus be seen (Fig. 2) that the rubber wall is uniformly distorted in all its portions.

The pressure thus generated by the distortion of the wall 1 of the transmitting system is transmitted, by the pipe 12, to the receiving apparatus, the wall 1 of which uniformly swells and pushes outwardly the piston $25^a$, which, in its turn, pushes the piston $26^a$.

When the stress ceases on the piston 13, the resiliency of the rubber wall 1 of the transmitting system, brings back all the parts of the said system to their position of rest. The piston $26^a$ is returned to its position of rest by the elastic reaction of the element upon which its acts.

What I claim as my invention and desire to secure by Letters Patent is:—

In a hydraulic stress transmitting system, a pressure producing element comprising a distortable hemispherical wall, the convexity of which is in contact with the liquid, a piston arranged in the concavity of the hemispherical wall, sleeves arranged for fitting into each other and around the piston and to be in contact with the distortable wall, the said sleeves being provided with longitudinal notches, said notches being of graduated depth, a transverse pin mounted on the piston and fitting into the said notches for successively compelling each of the sleeves to follow the movement of the piston.

In testimony whereof I have signed this specification.

DIMITRI SENSAUD DE LAVAUD.